United States Patent
Pamplin

(10) Patent No.: US 12,414,653 B1
(45) Date of Patent: Sep. 16, 2025

(54) PORTABLE BLENDER WITH SOAP RESERVOIR AND CLEANING MODE

(71) Applicant: MavorCo Operations LLC, New York, NY (US)

(72) Inventor: Ryan Michael Pamplin, San Juan, PR (US)

(73) Assignee: MavorCo Operations LLC, New York, NY (US)

( * ) Notice: Subject to any disclaimer, the term of this patent is extended or adjusted under 35 U.S.C. 154(b) by 764 days.

(21) Appl. No.: 17/549,600

(22) Filed: Dec. 13, 2021

(51) Int. Cl.
| | |
|---|---|
| A47J 43/00 | (2006.01) |
| A47J 43/07 | (2006.01) |
| A47J 43/08 | (2006.01) |
| B01F 27/808 | (2022.01) |
| B01F 35/10 | (2022.01) |
| B01F 35/32 | (2022.01) |
| B01F 101/06 | (2022.01) |

(52) U.S. Cl.
CPC ....... *A47J 43/0722* (2013.01); *A47J 43/0766* (2013.01); *A47J 43/085* (2013.01); *B01F 27/808* (2022.01); *B01F 35/1452* (2022.01); *B01F 35/32025* (2022.01); *B01F 2101/06* (2022.01)

(58) Field of Classification Search
CPC .. A47J 43/0722; A47J 43/0766; A47J 43/085; B01F 27/808; B01F 35/32025; B01F 35/1452; B01F 2101/06
See application file for complete search history.

(56) References Cited

U.S. PATENT DOCUMENTS

| | | | |
|---|---|---|---|
| 2014/0061345 A1* | 3/2014 | Machovina | A47J 43/0722 241/282.1 |
| 2014/0301155 A1* | 10/2014 | Montgomery | B01F 35/32025 366/142 |
| 2018/0326378 A1* | 11/2018 | Moon | B01F 33/70 |
| 2019/0276297 A1* | 9/2019 | Tewari | B67D 3/0061 |
| 2021/0177212 A1* | 6/2021 | Siu | A47J 43/0777 |
| 2021/0275981 A1* | 9/2021 | Jain | A47J 43/0716 |
| 2022/0040652 A1* | 2/2022 | Schandel | A47J 43/0722 |

* cited by examiner

Primary Examiner — Anshu Bhatia
(74) Attorney, Agent, or Firm — Esplin & Associates, PC

(57) ABSTRACT

A portable blender with a soap reservoir and a cleaning mode of operation is disclosed. Exemplary implementations may include includes a blending component, a base assembly, a container assembly, a soap reservoir, a soap dispenser, a control interface, and control circuitry, and/or other components. The blender includes a control interface configured to be manually engaged by the user. The control interface controls the operating mode of the portable blender, including the cleaning mode of operation. During the cleaning mode of operation, the soap dispenser is controlled to dispense an amount of soap into the container body of the container assembly.

15 Claims, 7 Drawing Sheets

PORTABLE BLENDER WITH SOAP RESERVOIR AND CLEANING MODE

FIELD OF THE DISCLOSURE

The present disclosure relates to a portable blender with a soap reservoir and a cleaning mode of operation.

BACKGROUND

Blenders are known, typically as consumer-grade home appliances. The need to clean appliances, including blenders, is known.

SUMMARY

One aspect of the present disclosure relates to a portable blender with a soap reservoir and a cleaning mode of operation. The portable blender is configured to blend foodstuffs. In some implementations, the blender may be portable due to its size, and/or its rechargeability. By virtue of true portability, a user can take the blender anywhere and create drinks, shakes, smoothies, baby food, sauces, and/or other concoctions. Once the blender is fully charged, a user can prepare multiple servings quickly and easily. Lack of an external power source, much less a reliable external power source, is no longer preventing users from enjoying blended drinks. By virtue of the soap reservoir described in this disclosure, cleaning the blender after use is easy.

The blender may include a base assembly, a container assembly, a control interface, a soap reservoir, a soap dispenser, control circuitry, and/or other components. As used herein, the term "foodstuffs" may include ingredients ranging from solid to liquid, from hot to cold or frozen, in any combination. As used herein, the term "ingredient" merely connotates something fit to ingest, and not necessarily nutritional value. For example, ice and/or ice cubes may be ingredients.

Another aspect of the present disclosure is a method for controlling operations of a blender supporting at least two modes of operation of the blender. The at least two modes of operation include a blending mode of operation and a cleaning mode of operation. The method may include holding the foodstuffs within a container body during blending by the portable blender. The container body is included in a container assembly. The method may include detecting whether a first type of manual engagement of a control interface by a user occurred. The method may include, responsive to detection of the first type of manual engagement, transitioning the portable blender to the cleaning mode of operation. The method may include, responsive to the blender operating in the cleaning mode of operation, controlling the soap dispenser to dispense an amount of soap into the container body of the container assembly. The method may include detecting whether a second type of manual engagement of the control interface by the user occurred. The method may include, responsive to detection of the second type of manual engagement, transitioning the portable blender to the blending mode of operation. The method may include, responsive to the portable blender operating in the blending mode of operation, controlling the soap dispenser to not dispense the soap into the container body of the container assembly. The method may include selectively controlling rotation of the blending component during the cleaning mode of operation and during the blending mode of operation.

As used herein, any association (or relation, or reflection, or indication, or correspondency) involving assemblies, blending components, blades, motors, rotational axes, longitudinal axes, diameters, batteries, couplings, interfaces, buttons, detectors, indicators, magnetic elements, caps, rotations, modes of operation, and/or another entity or object that interacts with any part of the blender and/or plays a part in the operation of the blender, may be a one-to-one association, a one-to-many association, a many-to-one association, and/or a many-to-many association or "N"-to-"M" association (note that "N" and "M" may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
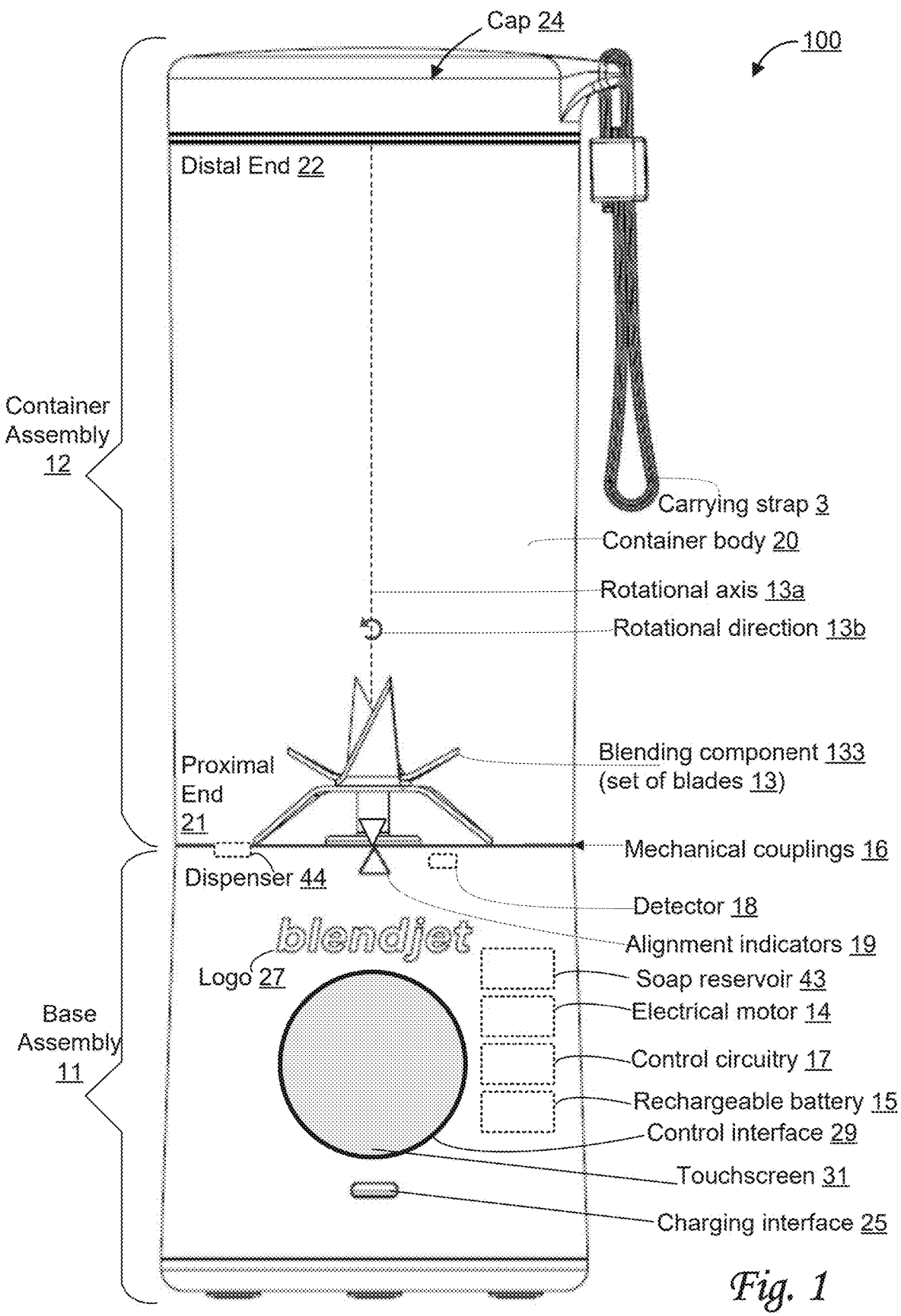
FIG. 1 shows a front view of a portable blender configured to blend foodstuffs, in accordance with one or more implementations.

FIG. 1 shows a portable blender 100 (hereinafter blender 100) configured to blend foodstuffs, in accordance with one or more implementations. Blender 100 may include one or more of a base assembly 11, a container assembly 12, control circuitry 17 (depicted in FIG. 1 as a dotted rectangle to indicate this component may be embedded within base assembly 11, and not readily visible from the outside), a soap reservoir 43 (depicted in FIG. 1 as a dotted rectangle to indicate this component may be embedded within base assembly 11, and not readily visible from the outside), a soap dispenser 44 (depicted in FIG. 1 as a dotted rectangle to indicate this component may be embedded within or on base assembly 11, and not readily visible from the depicted angle), and/or other components. Base assembly 11 and container assembly 12 may be configured to be coupled during blending by blender 100. For example, in some implementations, base assembly 11 and container assembly 12 may be mechanically coupled, e.g., through one or more threaded couplings. Other types of couplings may be envisioned for blender 100, though leak-proof options may be preferred, since most uses include one or more liquid ingredients. In some implementations, control circuitry 17 and/or other components may be included in base assembly 11, e.g., completely or partially within base assembly 11. For example, one or more of control circuitry 17, electrical motor 14, rechargeable battery 15, and/or other components may be integrated permanently into base assembly 11 such that base assembly 11 forms an integral whole.

Blender 100 may be configured to operate in at least two different modes of operation, including a cleaning mode of operation and at least one blending mode of operation. Foodstuffs may commonly be blended in the blending mode(s) of operation. The cleaning mode of operation is intended to clean blender 100 after use. For example, blender 100 may be configured to dispense soap into container assembly 12 and/or a container body 20 during the cleaning mode (e.g., such that the soap mixes with water that the user added to the blender). By activating the blender, the mixture of water and soap may clean blender 100. Upon rinsing out the soapy mixture, blender 100 may be clean and ready for regular use (i.e., blending foodstuffs).

Base assembly 11 may include one or more of a base body 11b (FIG. 5), a blending component 133 (e.g., a set of blades 13, also referred to as a set of one or more blades 13), an electrical motor 14 (depicted in FIG. 1 as a dotted rectangle to indicate this component may be embedded within base assembly 11), a rechargeable battery 15 (depicted in FIG. 1 as a dotted rectangle to indicate this component is embedded within base assembly 11), soap reservoir 43, soap dispenser 44, a standardized charging interface 25, one or more mechanical couplings 16, a detector 18, one or more alignment indicators 19, a control interface 29, a logo 27 (which may visually refer to a corporate identity), and/or other components.

Proximal end 21 of container assembly 12 may be disposed near blending component 133 (e.g., near set of blades 13) during blending of blender 100. Distal end 22 of container assembly 12 may be disposed opposite proximal end 21.

Figure 7:
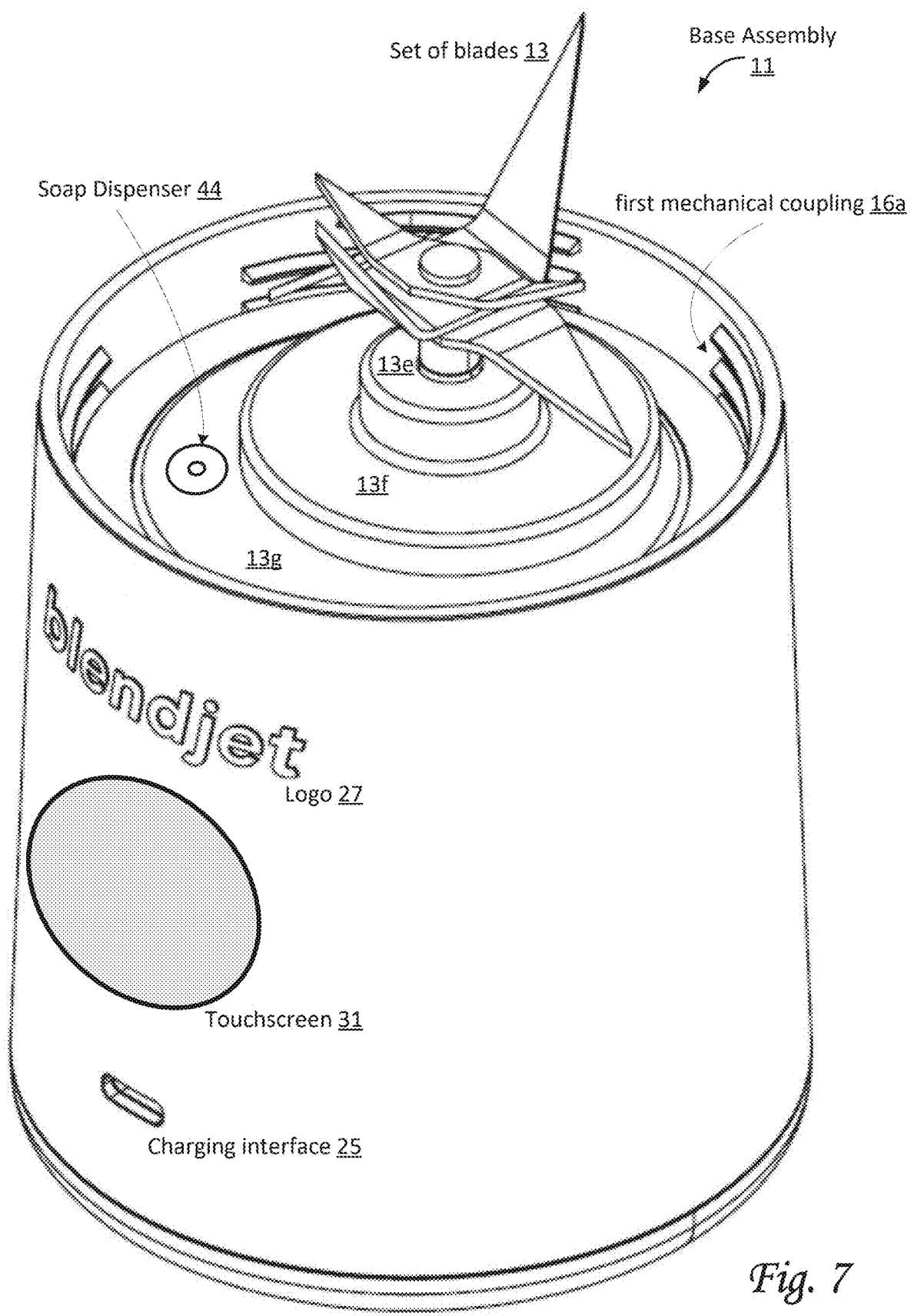
FIG. 7 shows a perspective elevated view of a base assembly of a portable blender, in accordance with one or more implementations.

In some implementations, one or more mechanical couplings 16 may include threaded couplings. By way of non-limiting example, FIG. 7 shows a view of blender 100 configured to blend foodstuffs, including a first mechanical coupling 16a. For example, one or more mechanical couplings 16 may include first mechanical coupling 16a and a matching mechanical coupling in container assembly 12. In some implementations, first mechanical coupling 16a included in base assemble 11 may be a female threaded coupling configured to fit together with the mechanical coupling of container assembly 12. First mechanical coupling 16a and the matching mechanical coupling may be configured to (temporarily and detachably) couple base assembly 11 to container assembly 12.

A mechanical coupling included in container assembly 12 may be disposed at or near proximal end 21 of container assembly 12. This mechanical coupling may be configured to engage first mechanical coupling 16a to couple base assembly 11 to container assembly 12. In some implementations, first mechanical coupling 16a and this mechanical coupling may be threaded couplings. In some implementations, one or more of mechanical couplings 16 may have parallel threads.

Figure 4:
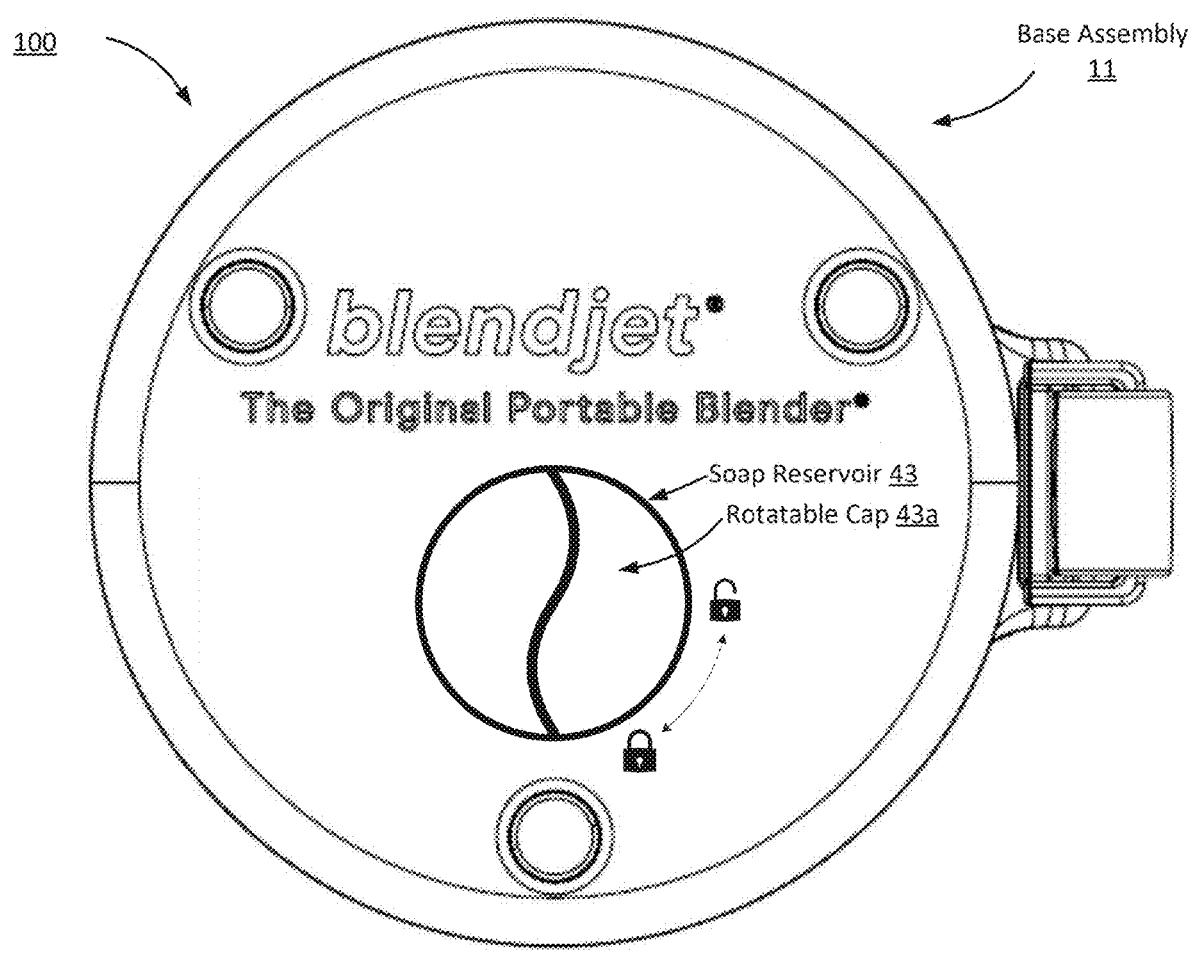
FIG. 4 shows a bottom view of a portable blender, in accordance with one or more implementations.

By way of non-limiting example, FIG. 4 shows a bottom view of blender 100 depicting the bottom of base assembly 11, including soap reservoir 43 (with a manually removable reservoir cover referred to here as a rotatable cap 43a configured to open or unlock when rotated clockwise and close or lock when rotated counterclockwise, as indicated by the corresponding locks in FIG. 4). Other mechanisms to open or close the manually removable reservoir cover are envisioned within the scope of this disclosure, including but not limited to covers that snap in place or that are held in place by a non-rotating mechanical coupling. Soap reservoir 43 may be configured to hold soap, e.g., liquid soap, e.g., within a cavity inside base assembly 11. Once rotatable cap 43 is open or unlocked, a user may have access to soap reservoir 43, e.g., to add soap into soap reservoir 43. In some implementations, rotatable cap 43a may include a mechanical coupling, such as a threaded coupling (not depicted). In some implementations, soap reservoir 43 may be coupled to soap dispenser 44 (e.g., depicted in FIG. 6 and FIG. 7). In some implementations, soap dispenser 44 provides the user with access to fill soap reservoir 43. In some implementations, control circuitry 17 may be configured to determine and/or detect the amount of soap in soap reservoir 43 (e.g., through a sensor within soap reservoir 43, not depicted). In some implementations, control circuitry 17 may be configured to determine and/or detect whether the amount of soap in soap reservoir 43 is below a threshold level. In some implementations, control circuitry 17 may be configured to notify a user (e.g., through control interface 29), responsive to a detection that the amount of soap in soap reservoir 43 is below a threshold level.

Figure 6:
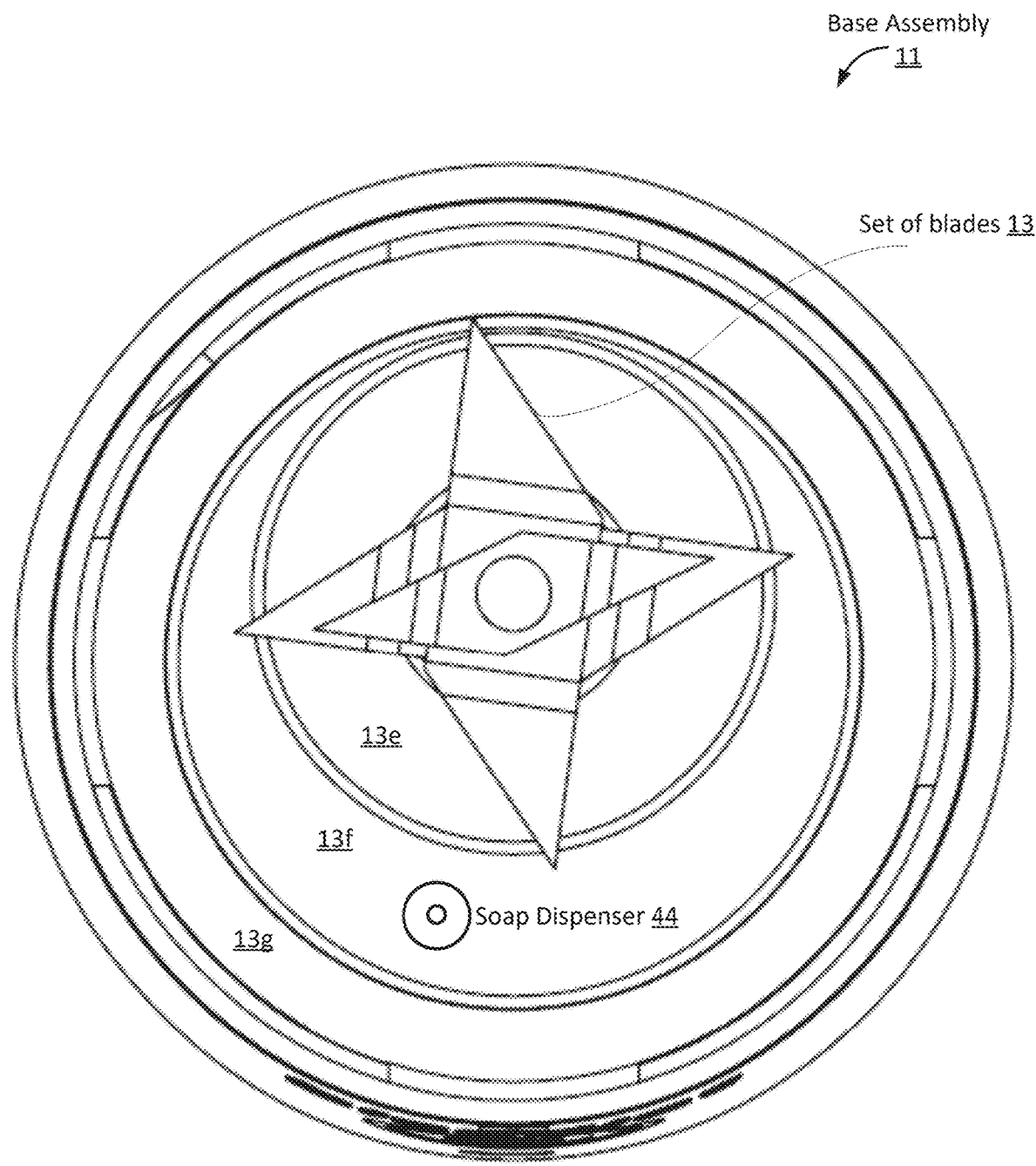
FIG. 6 shows a top view of a base assembly of a portable blender, in accordance with one or more implementations.

By way of non-limiting example, FIG. 6 and FIG. 7 shows views of base assembly 11, including soap dispenser 44. Soap dispenser 44 may be configured to selectively dispense soap, from soap reservoir 43, into container body 20. In some implementations, soap dispenser 44 is configured to dispense an amount of soap during a cleaning mode of operation. Control circuitry 17 may be configured to control the operation of soap dispenser 44, e.g., based on the particular mode of operation. In some implementations, soap dispenser 44 may be coupled to soap reservoir 43 (e.g., via a tube and/or other flow path, not depicted). In some implementations, soap dispenser 44 may be disposed on top of base assembly 11. In some implementations, soap dispenser 44 may be disposed below set of blades 13. In some implementations, soap dispenser 44 may be a two-way sealable dispenser configured to seal in each direction, such that soap is prevented from entering container body 20 until and unless controlled to do so by control circuitry 17, and further such that the contents of container body 20 is prevented from entering soap dispenser 44 and/or soap reservoir 43.

Referring to FIG. 1, blending component 133 may include one or more structural components configured to blend foodstuffs, including but not limited to one or more blending bars, one or more blades, and/or other structural components configured to rotate. For example, in some implementations, blending component 133 may include set of blades 13, which may be rotatably mounted to base assembly 11 to blend foodstuffs. Blending component 133 may be configured to rotate around a rotational axis 13a. Rotational axis 13a is depicted in FIG. 1 as a geometric 2-dimensional line extending indefinitely through blending component 133, and is not a physical axis. Rather, rotational axis 13a indicates how blending component 133 rotates in relation to other components of blender 100, in a rotational direction 13b. In some implementations, blending component 133 may be mounted permanently to base assembly 11. In some implementations, blending component 133 may be disposed at or near proximal end 21 of container assembly 12 during blending by blender 100. In some implementations, set of blades 13 may include 1, 2, 3, 4, 5, or more pairs of blades. In some implementations, a pair of blades may include two blades on opposite sides of rotational axis 13a. In some implementations, a pair of blades may have two blades such that the distal ends of these two blades are at the same horizontal level. In some implementations, as depicted in the upright configuration of blender 100 in FIG. 1, set of blades 13 may include six blades that form 3 pairs of blades. In some implementations, set of blades 13 may include at least two downward blades, which may prevent and/or reduce foodstuffs remaining unblended when disposed under the upward blades. In some implementations, set of blades 13 may include at least four upward blades. In some implementations, including six blades may be preferred over including less than six blades, in particular for blending ice and/or ice cubes. By using more blades, more points of contact will hit the ice at substantially the same time, which reduces the likelihood that a piece of ice is merely propelled rather than broken, crushed, and/or blended, in particular for implementations having limited power (when compared to blenders that are connected to common outlets), such as disclosed herein. As used herein, directional terms such as upward, downward, left, right, front, back, and so forth are relative to FIG. 1 unless otherwise noted.

Figure 5:
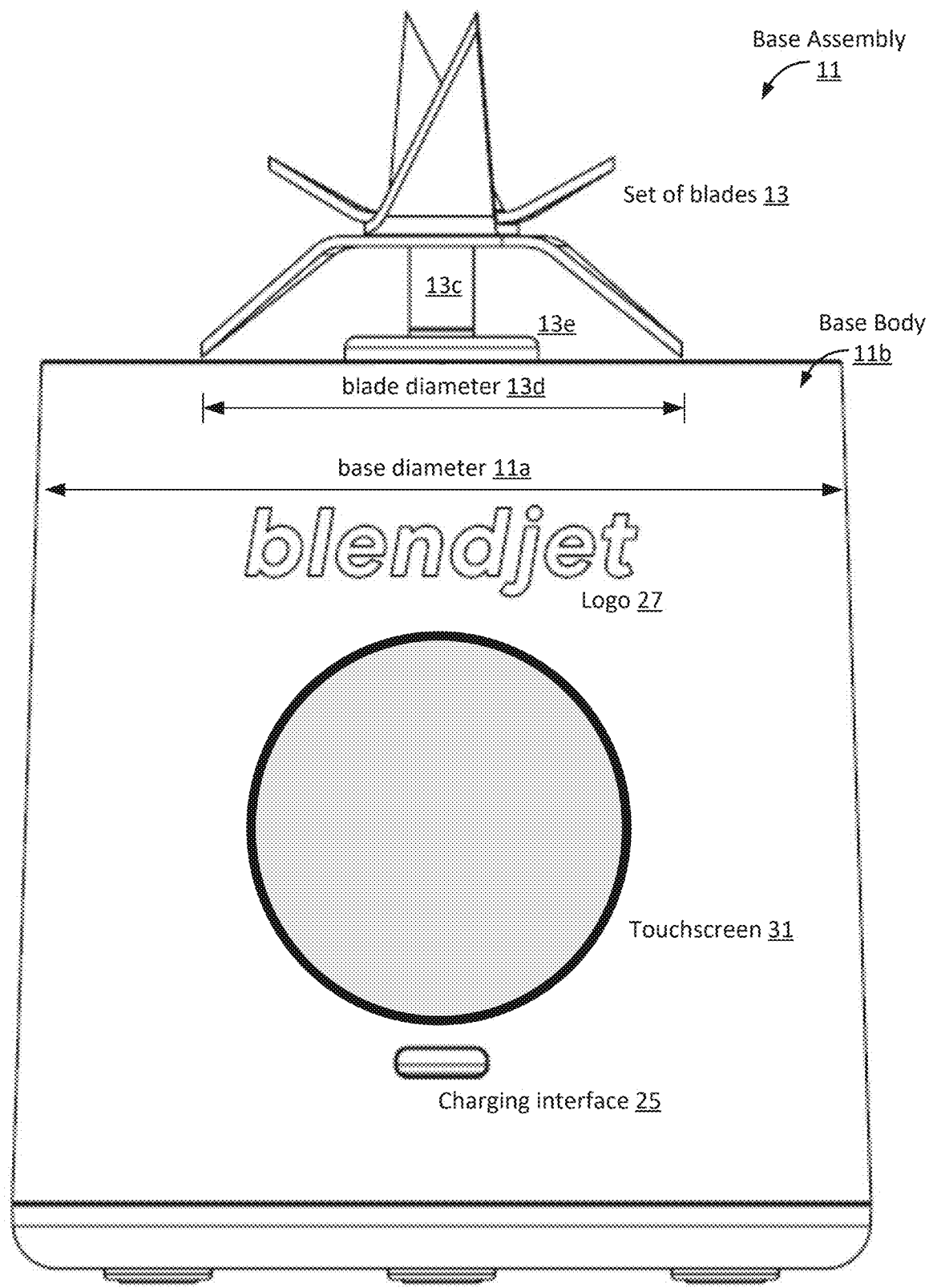
FIG. 5 shows a front view of a base assembly of a portable blender, in accordance with one or more implementations.

Referring to FIG. 1, in some implementations, base assembly 11 may have a cylindrical shape (apart from blending component 133 and/or set of blades 13). For example, horizontal cross-sections of base assembly 11 may have a circular shape. In some implementations, the cylindrical shape of base assembly 11 may have a diameter between 2 and 4 inches, which may be referred to as a base diameter. In some implementations, the cylindrical shape of base assembly 11 may have a base diameter between 3 and 3.5 inches. Such a base diameter may improve portability, as well as allow blender 100 to be stored in a cup holder, e.g., in a vehicle. For example, FIG. 5 shows a front view of base assembly 11, depicting a blade diameter 13d (e.g., the diameter of the circle described by rotation of the distal ends of the lowest pair of blades in set of blades 13) and a base diameter 11a (as measured at or near the top of base assembly 11). In some implementations, blade diameter 13d may refer to the largest diameter of any circle described by rotation of distal ends of pairs of blades in set of blades 13 (or other distal ends of blending component 133), as measured perpendicular to rotation. In some implementations, the orientation of blade diameter 13d may be orthogonal to the direction of rotational axis 13a. In some implementations, the plane of rotation of the distal ends of the blades (or other distal ends of blending component 133) that define blade diameter 13d may be orthogonal to the direction of rotational axis 13a. In some implementations, blade diameter 13d may be at least 50% of base diameter 11a. In some implementations, blade diameter 13d may be about 60% of base diameter 11a. In some implementations, blade diameter 13d may range between 50% and 70% of base diameter 11a. In some implementations, blade diameter 13d may range between 60% and 70% of base diameter 11a. In some implementations, blade diameter 13d may range between 60% and 80% of base diameter 11a. FIG. 5 shows set of blades 13 may be supported by a shaft 13c mounted on an upper blade mount 13e. FIGS. 6 and 7 show a lower blade mount 13f arranged below upper blade mount 13e. Below lower blade mount 13f is a surface 13g. In some implementations, surface 13g may form the lowest point for foodstuffs during blending. By virtue of the stepwise structure formed by upper blade mount 13e, lower blade mount 13f, and surface 13g, foodstuffs may be blended more efficiently. For example, ice may be crushed more finely using fewer rotations of the blades. In some implementations, the horizontal plane that coincides with the top surface of upper blade mount 13e may be orthogonal to rotational axis 13a. Alternatively, and/or simultaneously, in some implementations, the horizontal plane that coincides with the top surface of lower blade mount 13f may be orthogonal to rotational axis 13a. Alternatively, and/or simultaneously, in some implementations, the horizontal plane that coincides with surface 13g may be orthogonal to rotational axis 13a. In some implementations, the plane of rotation of the distal ends of the blades (or other distal ends of blending component 133) that define blade diameter 13d may be parallel to one or more of the top surface of upper blade mount 13e, the top surface of lower blade mount 13f, and/or surface 13g. As used herein, phrases pertaining to dimensions, such as various diameters, may refer to either blending component 133, set of blades 13, and/or both. For example, blade diameter 13d may refer to a blending bar, or to set of blades 13, and/or to other types of blending components.

In some implementations, blending component 133 may be mounted permanently on base assembly 11 such that base assembly 11 forms an integral whole. In some implementations, base assembly 11 may have a conical shape, wherein the bottom of the conical shape may have a diameter between 2 and 4 inches, and wherein the top of the conical shape may have a diameter between 2 and 4 inches. For example, the bottom of base assembly 11 may be wider than the top of base assembly 11, as depicted in FIG. 5.

Referring to FIG. 1, container assembly 12 may include one or more of a proximal end 21, a distal end 22, container body 20, a cap 24, a carrying strap 3, and/or other components. Container body 20 may form a vessel to hold and/or contain foodstuffs within container assembly 12. In some implementations, container body 20 may be a cylindrical body and/or have a cylindrical shape. In some implementations, container body 20 may be open at one or both ends. In some implementations, container body 20 may be closed at the bottom. In some implementations, the dimensions of container assembly 12 may be such that the internal volume of container assembly 12 can hold 8, 10, 12, 14, 16, 18, 20, 22, 24, 28, 32, 36, 48, or more ounces. In some implementations, container assembly 12 and/or container body 20 may have cylindrical shapes. As shown in FIG. 1, in some implementations, the cylindrical shapes of container assembly 12 and/or container body 20 may have a container diameter between 2 and 4 inches (as measured at or near the bottom of container body 20). In some implementations, container body 20 may have a container diameter at or near cap 24. In some implementations, these container diameters may be between 3 and 3.5 inches. In some implementations, container body 20 may be transparent. In some implementations, blade diameter 13d (see FIG. 5) may be at least 50% of the smallest container diameter. In some implementations, blade diameter 13d may be about 60% of the smallest container diameter. In some implementations, blade diameter 13d may range between 50% and 70% of the smallest container diameter. In some implementations, blade diameter 13d may range between 60% and 70% of the smallest container diameter. In some implementations, blade diameter 13d may range between 60% and 80% of the smallest container diameter.

Referring to FIG. 1, electrical motor 14 may be configured to rotationally drive blending component 133. In some implementations, electrical motor 14 may operate at a voltage between 5V and 10V. In one or more preferred implementations, electrical motor 14 may operate at a voltage of about 7.4V. In some implementations, electrical motor 14 may be configured to spin blending component 133 at a maximum speed between 15,000 rotations per minute (RPM) and 35,000 RPM. In one or more preferred implementations, electrical motor 14 may spin blending component 133 at a maximum speed of about 22,000 RPM. Electrical motor 14 may be configured to be powered by rechargeable battery 15. Simultaneously, in some implementations, electrical motor 14 may be further configured to be powered through standardized charging interface 25, though that may not be the preferred way of operating blender 100. In one or more preferred implementations, no power is (or need be) supplied to electrical motor 14 from an external power source during blending by blender 100. In some implementations, control circuit 17 may be configured to control electrical motor 14 during rotation of blending component 133. For example, control circuit 17 may selectively control the rotation of blending component 133 during blending by blender 100 (e.g., during the cleaning mode of operation and during the blending mode(s) of operation).

Referring to FIG. 1, rechargeable battery 15 may be configured to power electrical motor 14. In some implementations, rechargeable battery 15 may be configured to power electrical motor 14 such that, during blending by blender 100, no power is supplied to electrical motor 14 from an external power source. In some implementations, rechargeable battery 15 may be non-removable. As used herein, the term "non-removable" may mean not accessible to users during common usage of blender 100, including charging, blending, cleaning, and storing for later use. In some implementations, rechargeable battery 15 may be not user-replaceable. In some implementations, rechargeable battery 15 may be user-replaceable. In some implementations, rechargeable battery 15 may be store-bought. In some implementations, rechargeable battery 15 may have a capacity between 1000 mAh and 6000 mAh. In one or more preferred implementations, rechargeable battery 15 may have a capacity of about 2500 mAh. In some implementations, control circuit 17 may be configured to control charging of rechargeable battery 15. For example, control circuit 17 may control the transfer of electrical power through standardized charging interface 25 into rechargeable battery 15. For example, responsive to a detection that rechargeable battery 15 is fully charged, control circuit 17 may prevent the transfer of electrical power through standardized charging interface 25 into rechargeable battery 15.

Standardized charging interface 25 may be configured to conduct electrical power to rechargeable battery 15. In some implementations, standardized charging interface 25 may be configured to conduct electrical power to charge rechargeable battery 15, e.g., from an external power source. In some implementations, standardized charging interface 25 may be configured to support wireless charging of rechargeable battery 15, e.g., from an external power source, including but not limited to induction-based charging. In some implementations, standardized charging interface 25 may be a universal serial bus (USB) port configured to receive an electrical connector for charging rechargeable battery 15. In such a case, the electrical connector may be connected to an external power source. In some implementations, standardized charging interface 25 may be covered for protection and/or other reasons.

Detector 18 may be configured to detect whether first mechanical coupling 16a of base assembly 11 is engaged with another mechanical coupling of container assembly 12. In some implementations, detector 18 may be configured to detect whether base assembly 11 is coupled to container assembly 12 in a manner operable and suitable for blending by blender 100. In some implementations, operation of detector 18 may use one or more magnetic elements. For example, in some implementations, one or more magnetic elements are included in container body 20 at or near proximal end 21 of container assembly 12. Engagement may be detected responsive to these one or more magnetic elements being aligned and sufficiently close to one or more matching magnetic elements that may be included in base assembly 11 (e.g., at or near first mechanical coupling 16a of base assemble 11). In some implementations, blender 100 may include one or more alignment indicators 19, depicted in FIG. 1 as matching triangles, to visually aid the user in aligning base assembly 11 with container assembly 12 in a manner operable and suitable for blending. In some implementations, one or more alignment indicators 19 may be in the front, in the back, and/or in other parts of blender 100.

Control interface 29 may be part of the user interface of blender 100. Control interface 29 may be configured to be engaged manually by the user, for example by pushing control interface 29 to turn blender 100 on and off. In some implementations, control interface 29 may include a power button configured to be manually engaged by the user. In some implementations, control interface 29 may include a touchscreen 31 (as depicted in FIG. 1) configured to be manually engaged by the user. In some implementations, control interface 29 may support multiple types of manual engagement (e.g., including gestures by the user on touchscreen 31), including but not limited to a first type of manual engagement, a second type of manual engagement, a third type of manual engagement, and so forth. By way of non-limiting example, the first type of manual engagement may include pressing the power button and holding the power button depressed for at least a specified duration. For example, the specified duration may be at least 3 seconds, at least 4 seconds, at least 5 seconds, and/or another specified duration. By way of non-limiting example, the second type of manual engagement may be different from the first type of manual engagement. Other types of manual engagement may be contemplated within the scope of this disclosure, including but not limited to patterns of pressing and releasing the power button. In some implementations, control interface 29 may be configured to detect whether a particular type of manual engagement of control interface 29 by the user occurred.

In some implementations, control interface 29 may be configured to facilitate transitions between different modes of operation of portable blender 100. In some implementations, a transition may go from a blending mode of operation to the cleaning mode of operation, and/or vice versa. In some implementations, transitions between different modes of operation may occur responsive to detection of one or more particular types (or patterns) of manual engagement of control interface 29.

In some implementations, touchscreen 31 may be curved to match the cylindrical and/or conical shape of base assembly 11. In some implementations, touchscreen 31 may sit flush on base assembly 11. In some implementations, touchscreen 31 may include one or more of a lens, a glass top, an optical element, and/or other components. In some implementations, touchscreen 31 may be flat (i.e., level) and include a curved (topical) lens. The lens may be curved to match the cylindrical and/or conical shape of base assembly 11. The lens may be positioned on top of touchscreen 31 and/or may give the appearance that touchscreen 31 is curved. In some implementations, touchscreen 31 may protrude out from base assembly 11, such that the edge of touchscreen 31 creates a lip with base assembly 11. In some implementations, the lip of touchscreen 31 may have a height of 1 millimeters, 2 millimeters, 3 millimeters, and/or other measurements. In some implementations, the lip may surround the circumference of touchscreen 31.

In some implementations, control interface 29 may include one or more touchscreens, such as touchscreen 31. For example, touchscreen 31 may be configured to receive user input. As used herein, user input of a touchscreen may include one or more of tapping touchscreen 31, multiple consecutive occurrences of tapping on touchscreen 31, swiping touchscreen 31 (e.g., horizontally, vertically, and/or diagonally), and/or other user gestures (by way of non-limiting example, a circular swipe or gesture) or user interactions with touchscreen 31, and these may be considered types of manual engagement of control interface 29. In some implementations, control interface 29 includes exactly one touchscreen (i.e., touchscreen 31). For example, in some implementations, touchscreen 31 may be the only user-manipulatable portion of control interface 29, such that no other user interface component controls the operation of blender 100, or the transitions between different modes of operation used by blender 100.

In some implementations, control by a user of blender 100 may be based on a switch (not shown), a button, touchscreen 31, voice-controlled operation (not shown), gesture-based operation (not shown), and/or other types of user interfaces suitable to turn consumer appliances on and off. Control interface 29 may be configured to illuminate in various colors (red, blue, purple, etc.) and/or patterns (solid, fast blinking, slow blinking, alternating red and blue, etc.). Control interface 29 may convey information regarding the operational status of blender 100 to a user (e.g., the current mode of operation). The operation status of blender 100 may be determined by control circuitry 17. Control interface 29 may be controlled by control circuitry 17. For example, if control interface 29 is solid purple, blender 100 may be charging and/or insufficiently charged to blend. For example, if control interface 29 is solid blue, blender 100 may be ready for blending. For example, if control interface 29 is alternating red and blue, blender 100 may not be ready for blending due to base assembly 11 and container assembly 12 not being coupled properly and/or fully. For example, in some implementations, threaded couplings between assembly 11 and container assembly 12 may need to be tightened sufficiently for proper blending, and control interface 29 may warn the user when the treaded couplings are not tightened sufficiently.

Control circuitry 17 may be configured to control different functions and/or operations of blender 100, including but not limited to turning blender 100 on and off, transitioning between different modes of operation, charging of rechargeable battery 15, controlling of electrical motor 14 regarding and/or during rotation of blending component 133, determining whether mechanical couplings 16 are engaged properly for blending, controlling operation of control interface 29, dispensing soap from soap reservoir 43 through soap dispenser 44, and/or performing other functions for blender 100. In some implementations, control circuitry 17 may be configured to prevent rotation of blending component 133 responsive to a determination that mechanical couplings 16 are not engaged (or not engaged properly for the intended operation of blender 100). In some implementations, control circuitry 17 may be configured to control control interface 29 to convey information regarding the operational status of blender 100 to a user. For example, control interface 29 may include a light that can illuminate in various colors and/or patterns. In some implementations, control circuitry 17 may be implemented as a printed circuit board (PCB).

In some implementations, control circuitry 17 may be configured to control operation of control interface 29 to enable transitions between different modes of operation. For example, during a blending mode of operation or a ready-to-blend mode of operation, responsive to detection of a first type of manual engagement of control interface 29, control circuitry 17 may be configured to transition to the cleaning mode of operation. For example, during the cleaning mode of operation, responsive to detection of a second type of manual engagement of control interface 29, control circuitry 17 may be configured to transition to a blending mode of operation or a ready-to-blend mode of operation. In some implementations, control circuitry 17 may be configured to control soap dispenser 44 (e.g., to dispense soap, or to not dispense soap).

In some implementations, control circuitry 17 may be configured to make detections regarding one or more touchscreens of control interface 29. For example, control circuitry 17 may be able to detect whether touchscreen 31 has received (one or more types of) user input. User input may include one or more of the user single tapping, double tapping, swiping (horizontally from left to right, horizontally from right to left, vertically from top to bottom, vertically from bottom to top, and/or other types of swiping), tapping and holding, and/or other interactions or types of user input received through touchscreen 31. Control circuitry 17 may be configured to make different types of detections based on user input, including but not limited to first, second, and third types of detections. A first type of detections may indicate occurrences of the user touching touchscreen 31 in a first manner. A second type of detection may indicate occurrences of the user touching touchscreen 31 in a second manner that differs from the first manner. A third type of detection may indicate occurrences of the user touching touchscreen 31 in a third manner that differs from the first manner and the second manner, and so forth. In some implementations, touchscreen 31 may include one or more selection regions. Selection regions may include visible and invisible boundaries that divide the area of touchscreen 31 into separate selection regions. For example, touchscreen 31 may include one of more of two regions, three regions, four regions, six regions, and/or other numbers of regions. By way of non-limiting example, touchscreen 31 may be divided into two selection regions. In some implementations, the two regions may include the top half of touchscreen 31 and the bottom half of touchscreen 31. In some implementations, the two regions may include the left half of touchscreen 31 and the right half of touchscreen 31. In some implementations, the user touching the top half region may indicate occurrences of a particular type of detections and the user touching the bottom half region may indicate occurrences of a different particular type of detections. In some implementations, the user touching the left half region may indicate occurrences of a given type of detections and the user touching the right half region may indicate occurrences of a different type of detections. In some implementations, swiping left-to-right may be a different type of detection than swiping right-to-left. In some implementations, swiping top-to-bottom may be a different type of detection than swiping bottom-to-top.

In some implementations, control circuitry 17 may be configured to control operations of control interface 29 to enable one or more transitions between displays and/or presentations presented via touchscreen 31 (e.g., different sets of information and/or different options for accepting user input). Displays may include one or more of a home menu, a settings menu, a selection menu, a recipe menu, and/or other menus and/or presentations. For example, the first display may be one or more of a home menu and/or other displays. The second display may be one or more of a selection menu, a settings menu, a recipe menu, and/or other menus and/or presentations. The second display may be different than the first display. In some implementations, particular transitions between presentations may occur responsive to particular type of detections regarding control interface 29 and/or touchscreen 31. For example, a particular selection on a home menu or selection menu may effectuate a transition to a particular mode of operation, such that the user can select either the cleaning mode of operation or a blending mode of operation. In some implementations, a particular selection on a particular menu may correspond to the amount of soap dispensed through soap dispenser 44 during operation in the cleaning mode of operation. In other words, the user may select, through touchscreen 31, whether a smaller or greater quantity of soap is to be dispensed in the cleaning mode.

In some implementations, control circuitry 17 may be configured to control operations of control interface 29 to enable the user to make modifications to one or more aspects of one or more modes of operation. Aspects of one of more modes of operations may include one of more of (default) time duration, blending strength, blending speed, number of rotations of the blending component, blending direction, whether soap is dispensed, and/or other features of the mode of operation. In some implementations, modifications to one or more aspects of one of more modes of operation may occur responsive to an occurrence of a specific type of detections. By way of non-limiting example, modifications may occur after a transition from a first display to a settings menu display. In some implementations, the transition from the first display to the settings menu display may occur responsive to an occurrence of the second type of detections. In some implementations, the settings menu may appear on touchscreen 31 as a dial. The dial may include one or more indicators that correspond to the modifiable aspects of the modes of operation. For example, the user may mimic spinning and/or otherwise rotating the displayed dial as a form or type of user input. For example, the occurrence of certain types of detections may cause the dial to turn and the indicator to indicate a different time duration than the initial time duration, and, subsequently, may set the new time duration to the pertinent mode of operation. For example, rotation of set of blades 13 may by default be briefer in the cleaning mode of operation than in a blending mode of operation. In some implementations, a user may modify these default durations.

Figure 3A:
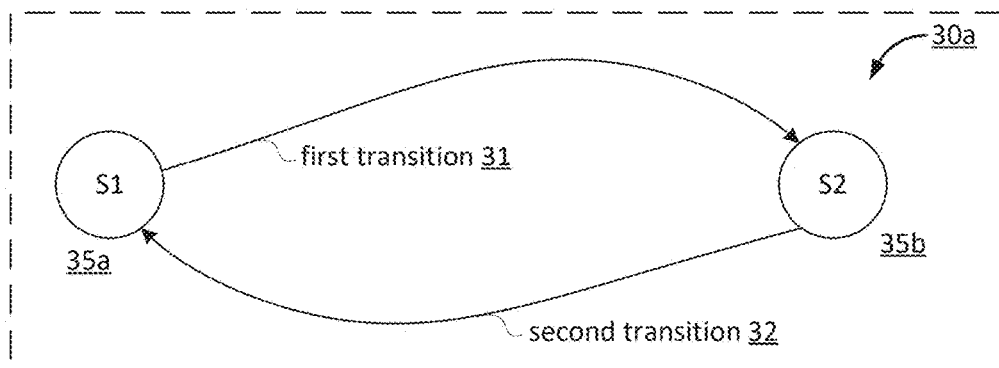
FIGS. 3A-3B-3C-3D illustrate state transitions in state diagrams as may be used by a portable blender, in accordance with one or more implementations.

By way of non-limiting example, FIG. 3A illustrates state transitions in a state diagram 30a as may be used by blender 100, e.g., responsive to different types of detections regarding control interface 29 being manipulated by a user as described elsewhere in this disclosure. As depicted, state diagram 30a may include a first state 35a (labeled "S1") and a second state 35b (labeled "S2"). First state 35a may correspond to a ready-to-blend mode of blender 100. Second state 35b may correspond to a first blending mode of operation of blender 100. As depicted here, a first transition 31 may transition the mode of operation of blender 100 from first state 35a to second state 35b. A second transition 32 may transition the mode of operation of blender 100 from second state 35b to first state 35a. First transition 31 may occur responsive to detection of the first type of detections. Second transition 32 may occur automatically, e.g., after completion of a first blending operation.

Figure 3B:
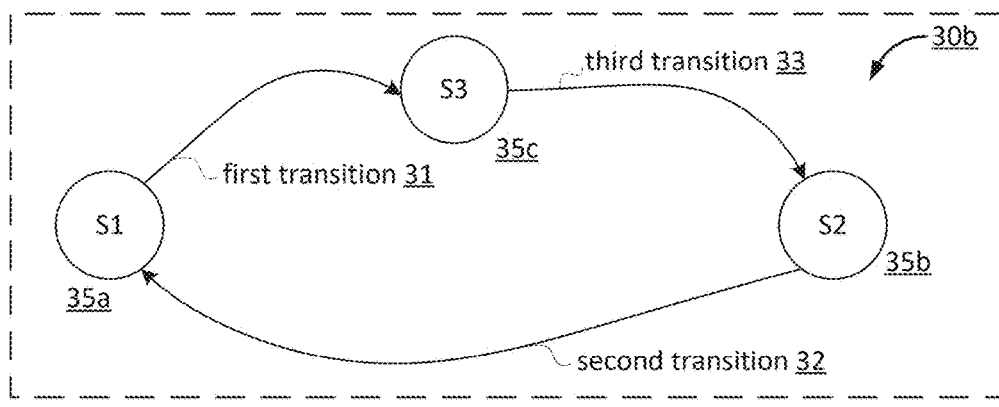

By way of non-limiting example, FIG. 3B illustrates state transitions in a state diagram 30b as may be used by blender 100, e.g., responsive to different types of detections regarding control interface 29 being manipulated by a user as described elsewhere in this disclosure. As depicted, state diagram 30b may include a first state 35a (labeled "S1"), a second state 35b (labeled "S2"), and a third state 35c (labeled "S3"). First state 35a may be similar as described regarding FIG. 3A. Second state 35b may correspond to the cleaning mode of operation of blender 100. Third state 35c may correspond to a blending mode of operation of blender 100. As depicted in state diagram 30b, a first transition 31 may transition the mode of operation of blender 100 from first state 35a to third state 35c. A second transition 32 may transition the mode of operation of blender 100 from second state 35b to first state 35a. A third transition 33 may transition the mode of operation of blender 100 from third state 35c to second state 35b. First transition 31 may occur responsive to detection of a particular type of detections. Third transition 33 may occur responsive to detection of a different type of detections during third state 35c. Second transition 32 may occur automatically.

Figure 3C:
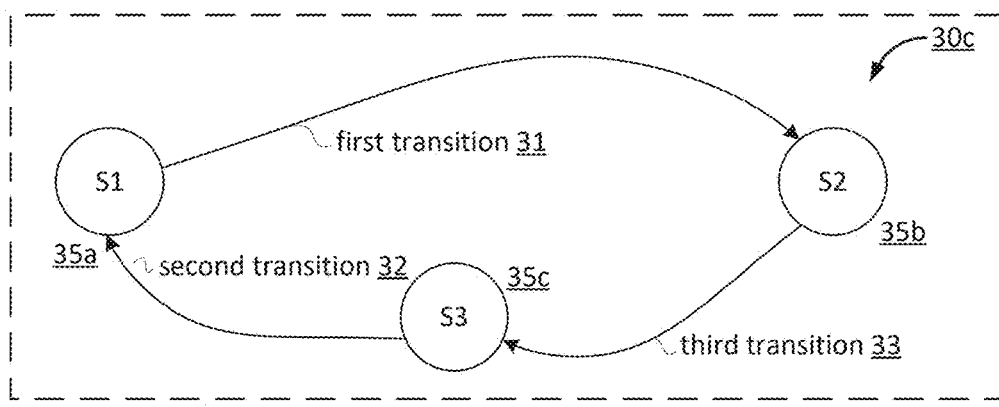

By way of non-limiting example, FIG. 3C illustrates state transitions in a state diagram 30c as may be used by blender 100, e.g., responsive to different types of detections regarding control interface 29 being manipulated by a user as described elsewhere in this disclosure. As depicted, state diagram 30b may include a first state 35a (labeled "S1"), a second state 35b (labeled "S2"), and a third state 35c (labeled "S3"). First state 35a may correspond to a blending mode of operation. Second state 35b may correspond to a mode of operation of blender 100 in which the user can interact and/or modify settings of blender 100. Third state 35c may correspond to the cleaning mode of operation of blender 100. As depicted in state diagram 30b, a first transition 31 may transition the mode of operation of blender 100 from first state 35a to second state 35b. A second transition 32 may transition the mode of operation of blender 100 from second state 35b back to first state 35a. A third transition 33 may transition the mode of operation of blender 100 from first state 35a to third state 35c. First transition 31 may occur responsive to a particular type of detection. Second transition 32 may occur responsive to a different particular type of detection. Third transition 33 may occur responsive to yet another type of detection.

Figure 3D:
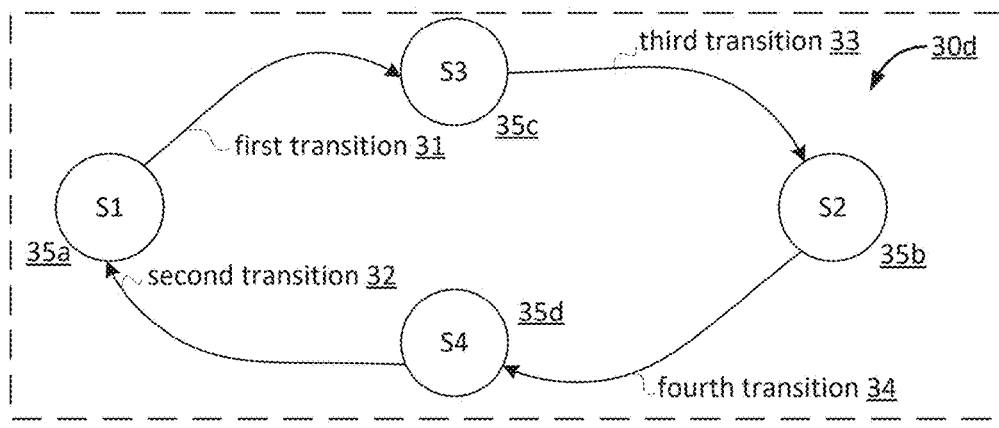

By way of non-limiting example, FIG. 3D illustrates state transitions in a state diagram 30d as may be user by blender 100, e.g., responsive to different types of detections regarding control interface 29 being manipulated by a user as described elsewhere in this disclosure. As depicted, state diagram 30b may include a first state 35a (labeled "S1"), a second state 35b (labeled "S2"), a third state 35c (labeled "S3"), and a fourth state 35d (labeled "S4"). Multiple depicted states may correspond to different blending modes of operation. At least one of the depicted states may correspond to the cleaning mode of operation. Different states may correspond to different presentations or displays being presented on touchscreen 31. As depicted in state diagram 30d, different transitions may transition both the depicted states and the presented displays.

Referring to FIG. 1, cap 24 may be disposed at or near distal end 22 of container assembly 12. In some implementations, cap 24 may be removable. For example, removing cap 24 may create an opening at distal end 22 of container assembly 12. In some implementations, blended foodstuffs may be removed through this opening, e.g., by pouring. In some implementations, coupling 24a of container assembly 12 may be configured to removably couple cap 24 to container body 20 and/or other components of container assembly 12. In some implementations, coupling 24a may be a threaded coupling. In some implementations, coupling 24a may have a parallel thread. In some implementations, carrying strap 3 may be configured for the user to carry blender 100. In some implementations, carrying strap 3 may be attached to cap 24 as depicted in FIG. 1. Alternatively, in some implementations, carrying strap 3 may be attached to container assembly 12, e.g., to container body 20.

Figure 2:
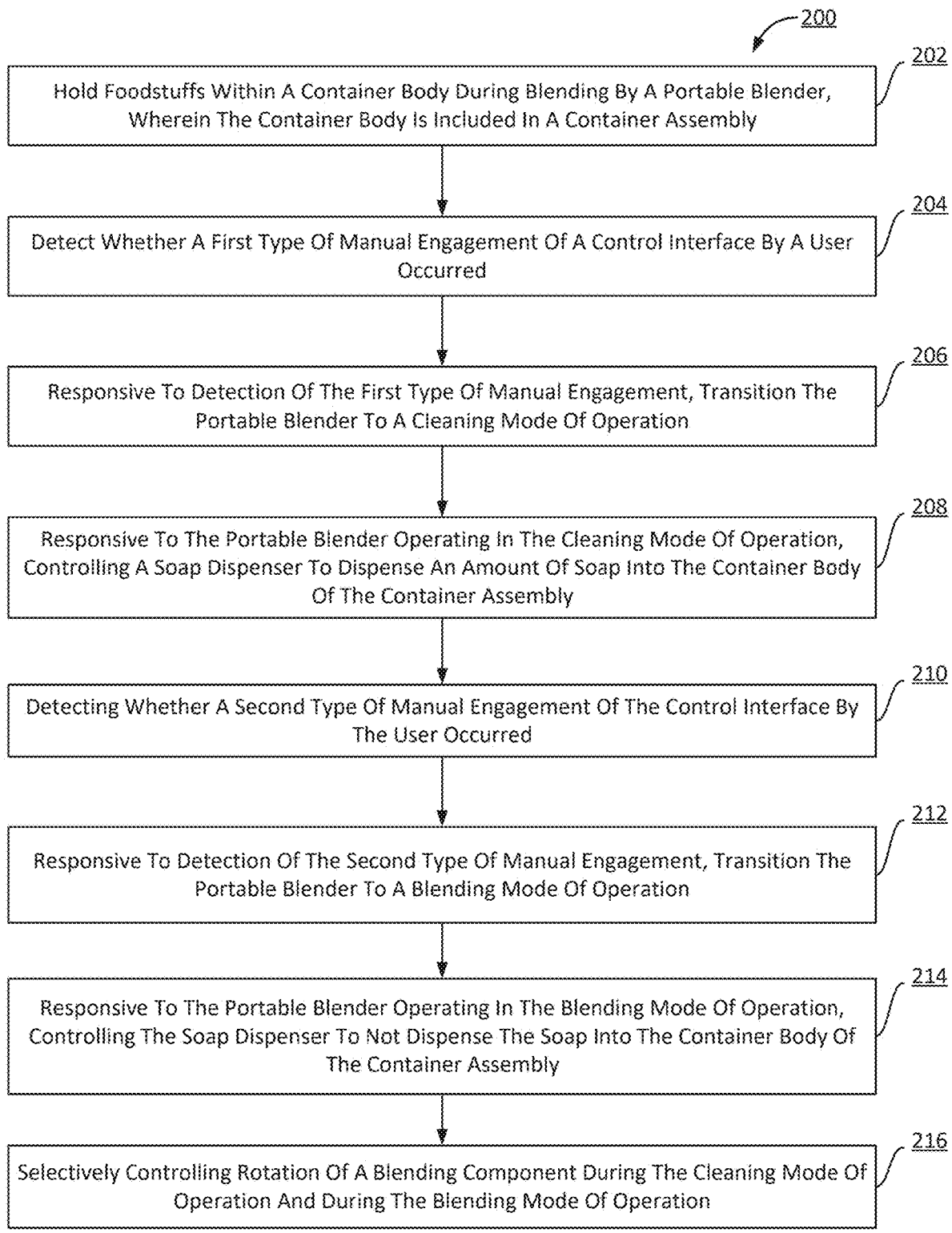
FIG. 2 shows a method for controlling operations of a portable blender, in accordance with one or more implementations.

FIG. 2 illustrates a method 200 for controlling operations of a portable blender supporting at least two modes of operation of the blender, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, foodstuffs are held within a container body during blending by the portable blender. The container body is included in the container assembly. In some embodiments, operation 202 is performed by a container body the same as or similar to container body 20 (shown in FIG. 1 and described herein).

At an operation 204, it is detected whether a first type of manual engagement of the control interface by a user occurred. In some embodiments, operation 204 is performed by a control interface the same as or similar to control interface 29 (shown in FIG. 1 and described herein).

At an operation 206, responsive to detection of the first type of manual engagement, the portable blender is transitioned to the cleaning mode of operation. In some embodiments, operation 206 is performed by control circuitry the same as or similar to control circuitry 17 (shown in FIG. 1 and described herein).

At an operation 208, responsive to the portable blender operating in the cleaning mode of operation, the soap dispenser is controlled to dispense an amount of soap into the container body of the container assembly. In some embodiments, operation 208 is performed by control circuitry the same as or similar to control circuitry 17 (shown in FIG. 1 and described herein).

At an operation 210, it is detected whether a second type of manual engagement of the control interface by the user occurred. In some embodiments, operation 210 is performed by a control interface the same as or similar to control interface 29 (shown in FIG. 1 and described herein).

At an operation 212, responsive to detection of the second type of manual engagement, the portable blender is transitioned to the blending mode of operation. In some embodiments, operation 212 is performed by control circuitry the same as or similar to control circuitry 17 (shown in FIG. 1 and described herein).

At an operation 214, responsive to the portable blender operating in the blending mode of operation, the soap dispenser is controlled to not dispense the soap into the container body of the container assembly. In some embodiments, operation 214 is performed by control circuitry the same as or similar to control circuitry 17 (shown in FIG. 1 and described herein).

At an operation 216, rotation of a blending component is selectively controlled during the cleaning mode of operation and during the blending mode of operation. In some embodiments, operation 216 is performed by control circuitry the same as or similar to control circuitry 17 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A portable blender configured to blend foodstuffs, the blender comprising:
   a blending component configured to rotate around a rotational axis and blend the foodstuffs during blending by the blender;
   a base assembly that includes an electrical motor configured to drive rotation of the blending component;
   a control interface configured to be engaged manually by the user, wherein the control interface is configured to control transitions to at least two modes of operation of the blender, wherein the at least two modes of operation include a blending mode of operation and a cleaning mode of operation;
   a container assembly configured to hold the foodstuffs within a container body during blending by the blender, wherein the container assembly includes:
      a proximal end that is disposed, subsequent to the base assembly being coupled to the container assembly, near the blending component; and
      a distal end opposite the proximal end;
   a soap reservoir configured to hold soap;
   a soap dispenser configured to selectively dispense the soap, from the soap reservoir, into the container body during the cleaning mode of operation; and
   control circuitry configured to:
      control the electrical motor during the rotation of the blending component,
      control operation of the control interface to enable a first transition to the cleaning mode of operation, wherein the first transition occurs responsive to a first type of manual engagement of the control interface by the user, responsive to the blender operating in the cleaning mode of operation, control the soap dispenser to dispense an amount of the soap into the container body, responsive to the blender operating in the blending mode of operation, control the soap dispenser to not dispense the soap, and selectively control the rotation of the blending component during the cleaning mode of operation and the blending mode of operation.

2. The portable blender of claim 1, wherein the soap reservoir and the soap dispenser are included in the base assembly.

3. The portable blender of claim 1, wherein the soap is liquid soap.

4. The portable blender of claim 1, wherein the soap reservoir is accessible through a manually removable reservoir cover disposed on a bottom of the base assembly.

5. The portable blender of claim 4, wherein the manually removable reservoir cover is configured to mechanically couple to the base assembly via a threaded coupling.

6. The portable blender of claim 1, wherein the soap reservoir is accessible through the soap dispenser, wherein the soap dispenser is a two-way sealable dispenser, and wherein the soap dispenser is disposed on a top of the base assembly.

7. The portable blender of claim 1, wherein the control circuitry is further configured to detect whether the amount of soap in the soap reservoir is below a threshold level, and wherein the control interface is further configured to notify the user responsive to a detection that the amount of soap in the soap reservoir is below the threshold level.

8. The portable blender of claim 1, wherein the control circuitry is further configured to select the amount of the soap that is dispensed through the soap dispenser, and wherein the control interface is further configured to enable a selection by the user that corresponds to the amount of soap that is dispensed through the soap dispenser.

9. The portable blender of claim 1, wherein the base assembly includes a first mechanical coupling configured to couple the base assembly to the container assembly, wherein the container assembly includes a second mechanical coupling disposed at or near the proximal end of the container assembly, wherein the second mechanical coupling is configured to engage the first mechanical coupling of the base assembly to couple the base assembly to the base assembly.

10. The portable blender of claim 1, wherein the blending component is a set of blades.

11. The portable blender of claim 1, further comprising:

a rechargeable battery configured to power the electrical motor; and a standardized charging interface configured to conduct electrical power to the rechargeable battery.

12. The portable blender of claim 1, further comprising a detector configured to make a detection whether the base assembly is coupled to the container assembly in a manner operable and suitable for blending by the blender, wherein the rotation of the blending component is prevented based on the detection by the detector that the base assembly is not coupled to the container assembly in a manner operable and suitable for blending by the blender, and wherein the rotation of the blending component is allowable responsive to the detection by the detector that the base assembly is coupled to the container assembly in a manner operable and suitable for blending by the blender.

13. The portable blender of claim 12, wherein the container body includes one or more magnetic elements disposed at or near the proximal end of the container assembly, and wherein detection by the detector is based on proximity of magnetic elements in the detector with the one or more magnetic elements included in the container body.

14. A method for controlling operations of a portable blender supporting at least two modes of operation of the blender, wherein the at least two modes of operation include a blending mode of operation and a cleaning mode of operation, wherein the portable blender includes a blending component, a base assembly, a container assembly, a soap reservoir, a soap dispenser, a control interface, and control circuitry, the method comprising:

holding the foodstuffs within a container body during blending by the portable blender, wherein the container body is included in the container assembly;

detecting whether a first type of manual engagement of the control interface by a user occurred;

responsive to detection of the first type of manual engagement, transitioning the portable blender to the cleaning mode of operation;

responsive to the blender operating in the cleaning mode of operation, controlling the soap dispenser to dispense an amount of soap into the container body of the container assembly;

detecting whether a second type of manual engagement of the control interface by the user occurred;

responsive to detection of the second type of manual engagement, transitioning the portable blender to the blending mode of operation;

responsive to the portable blender operating in the blending mode of operation, controlling the soap dispenser to not dispense the soap into the container body of the container assembly; and selectively controlling rotation of the blending component during the cleaning mode of operation and during the blending mode of operation.

15. The method of claim 14, further comprising:

detecting whether the amount of soap in the soap reservoir is below a threshold level; and notifying the user responsive to a detection that the amount of soap in the soap reservoir is below the threshold level.

* * * * *